United States Patent [19]
Fan et al.

[11] Patent Number: 5,959,577
[45] Date of Patent: Sep. 28, 1999

[54] METHOD AND STRUCTURE FOR DISTRIBUTION OF TRAVEL INFORMATION USING NETWORK

[75] Inventors: Rodric C. Fan, Fremont; Amin A. Mufti, Kensington, both of Calif.

[73] Assignee: Vectorlink, Inc., Fremont, Calif.

[21] Appl. No.: 08/924,042

[22] Filed: Aug. 28, 1997

[51] Int. Cl.$^6$ .................................................. G01S 5/02
[52] U.S. Cl. ................................. 342/357.13; 701/208
[58] Field of Search ......................... 342/357, 357.13; 701/208, 213

[56] References Cited

U.S. PATENT DOCUMENTS

| | | | |
|---|---|---|---|
| 5,814,149 | 10/1998 | Kawai et al. | 701/200 |
| 5,848,373 | 12/1998 | DeLorme et al. | 342/357 X |

*Primary Examiner*—Mark Hellner
*Attorney, Agent, or Firm*—Skjerven, Morrill, MacPherson, Franklin, Friel LLP; Edward C. Kwok

[57] ABSTRACT

A method is provided for processing position and travel related information through a data processing station on a data network. In one embodiment, a GPS receiver is used to obtain a measured position fix of a mobile unit. The measured position fix is reported to the data processing station which associates the reported position to a map of the area. Typically, the measured position of the mobile unit is marked and identified by a marker on the map. The area map is then stored in the data processing station and made available for access by authorized monitor units or mobile units. An authorized monitor unit may request for a specific area map by sending a request through the data network. Upon receiving a request, the data processing unit sends the area map to the monitor unit. Data processing station may also perform a database search for travel-related information, such as directions to a gasoline station.

44 Claims, 8 Drawing Sheets

| 160 | 162 | 165 | 168 | 170 |
|---|---|---|---|---|
| ID | Time | Latitude | Longitude | Velocity |
| XX | XXX | XXXX | XXXX | XXX |
| ** | * | ** | ** | * |
| ** | * | ** | ** | * |

FIG. 7

| 172 | 175 | | | | | | | | 178 |
|---|---|---|---|---|---|---|---|---|---|
| ID | PR1, | PR2, | PR3, | PR4, | PR5, | PR6, | PR7, | PR8 | Time |
| MU1 | X | X | X | X | X | X | X | X | 1:00.00 |
| MU1 | – | X | X | X | X | – | X | X | 1:00.10 |

FIG. 8

| 180 | 186 | | | | | | | | 188 |
|---|---|---|---|---|---|---|---|---|---|
| Area | DPR1, | DPR2, | DPR3, | DPR4, | DPR5, | DPR6, | DPR7, | DPR8, | Time |
| A | X | X | X | X | X | X | X | X | 1:00.00 |
| A | X | X | – | X | X | – | – | X | 1:00.10 |
| A | X | – | X | X | X | – | – | – | 1:00.50 |

FIG. 9

METHOD AND STRUCTURE FOR DISTRIBUTION OF TRAVEL INFORMATION USING NETWORK

BACKGROUND OF THE INVENTION

1. Field of Invention

This invention relates to a system and a method for locating vehicles, and more particularly to a system and a method which use a data network, such as the Internet, to monitor vehicle movements and to transmit travel-related information to vehicles.

2. Description of the Related Art

The global position system ("GPS") is used for obtaining position information. A GPS receiver receives ranging signals from several GPS satellites, and triangulates these received ranging signals to obtain the measured position of the receiver. A more detailed discussion of a GPS receiver is found in U.S. patent application ("Copending Application"), Ser. No. 08/779,698, entitled "Structure of An Efficient Global Positioning System Receiver," attorney docket no. M-4578, assigned to the present assignee. The Copending Application is hereby incorporated by reference.

One application of GPS is vehicle location. A conventional vehicle locating system typically includes one or more ground stations and many mobile units installed on the vehicles. In such a system, each mobile unit is equipped with a GPS receiver and a wireless transmitter. Using the GPS receiver, a mobile unit determines the position of the vehicle and then transmits the position directly to a ground station. The ground station receives the positions of all vehicles, and displays these positions on a digital map on a display device. The ground station of a conventional vehicle locating system normally also includes a map database search system, a media reader (e.g., a CD-ROM drive) and media (e.g., CD-ROMs) that store digital maps and travel-related information. Using the stored digital maps and positioning information received from the GPS satellites, the operator of the ground station can determine a present position for the vehicle.

The conventional vehicle locating system described above has several limitations. First, a direct wireless communication link between a vehicle and the ground station is required. Such a communication link is expensive, especially for long-distance communication. Further, special software must be installed on each ground station which adds to time and money costs. Thus a conventional vehicle locating system is impractical for a small company that has only a small number of vehicles.

Secondly, conventional vehicle location systems are not standardized. Typically, a company using a vehicle locating system must devise its own map software and create its own digital maps. The amount of information that is available on a conventional vehicle locating system is limited by the capacity of the storage system. In addition, information in such a system is often updated by creating a new CD-ROM. Statistical information, such as traffic condition and traffic patterns of the routes, is typically not available because each operation is independent and isolated from the other.

SUMMARY OF THE INVENTION

According to the present invention, a data network, such as the Internet, is involved in locating mobile units. In one embodiment of the present invention, using a GPS receiver, position information of a mobile unit is determined from positioning signals received from GPS satellites and pseudo-ranges derived from the positioning signals. The GPS receiver triangulates the pseudo-ranges to obtain a measured position of the mobile unit. The measured position is then transmitted via a data network to a data processing station. The data processing station organizes the measured position and generates an area map which indicates by a position marker the position of each mobile unit. This are a map is made available to one or more monitor units connected to the data network.

In an other embodiment, using a GPS receiver, the mobile unit receives ranging signals from GPS satellites and calculates the pseudo-ranges to these satellites. These pseudo-ranges are then transmitted to the data processing station, where the measured position of the mobile unit is obtained through triangulation. Alternatively, the pseudo-range information is encrypted before transmission to the data processing unit to prevent unauthorized use. In another embodiment, the measured position is also corrected at the data processing station using differential correction data collected from a differential correction station installed in the same area where the mobile unit is located. A mobile unit may also send a request for a database search through the data network to the data processing station to obtain an area map or travel-related information.

BRIEF DESCRIPTION OF THE DRAWINGS

FIG. 7 represents one implementation of position table 33.

FIG. 8 illustrates a pseudo-range table 40 for indicating the pseudo-ranges of a mobile unit over a period of time.

FIG. 9 represents one implementation of delta-pseudo-range table 39, containing delta-pseudo-ranges obtained from various service areas.

DETAILED DESCRIPTION OF THE INVENTION

Figure 1:
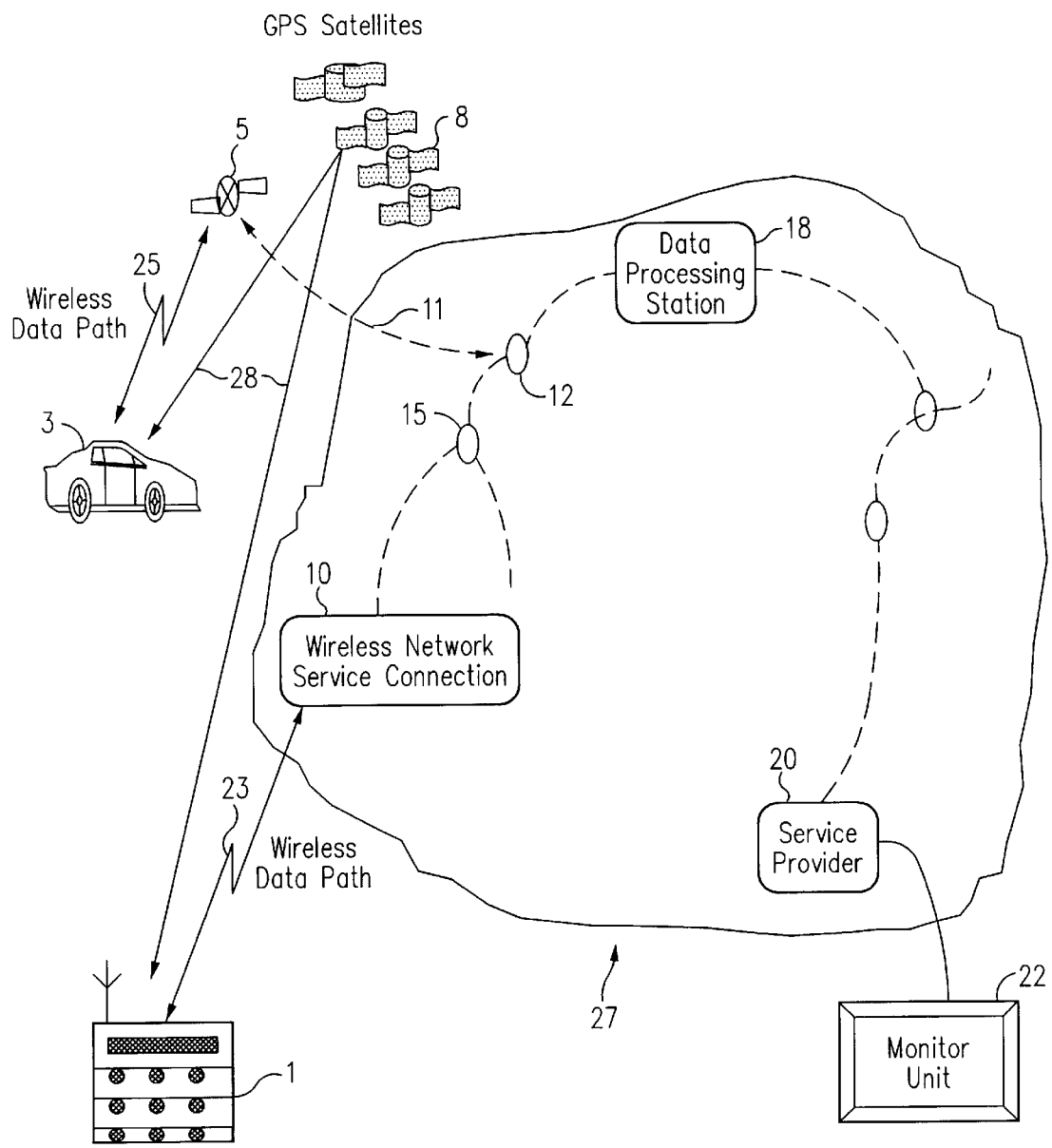
FIG. 1 illustrates a vehicle locating system which includes a data network 27, according to the present invention.

FIG. 1 illustrates a system of the present invention which includes a data network. As shown in FIG. 1, a vehicle locating system according to the present invention includes GPS satellite constellation 8, data network 27 with nodes 5, 10, 12 and 15, data processing station 18, monitor unit 22, and mobile units 1 and 3. Mobile unit 1 is a portable (e.g., handheld) device while mobile unit 3 is installed in a vehicle. Mobile units 1 and 3 each include a GPS receiver, a transmitter for transmitting messages to the data network, and a microprocessor. Each mobile unit can also be provided a data receiver for receiving messages from the data network. Mobile units may fall into different groups, which requires different handling procedures. For example, it may be convenient to group moving companies separately from taxi companies. Monitor units perform system-wide or regional control and data-gathering functions. The following description uses mobile unit 1 as an example of the mobile units of the present invention.

The mobile unit of the present invention allows a user to report his/her position and to obtain travel-related information over a data network. Travel-related information includes such information as directions to reach a destination (e.g., a gas station, a hotel, or a restaurant), or traffic conditions in the immediate vicinities of concern. Using a GPS receiver, mobile unit 1 receives a positioning signal which contains code sequences from GPS satellite constellation 8 and converts the code sequences into pseudo-range information. When the operator of the mobile unit wishes to request the travel-related information, a query is sent in an outbound data package. The outbound data package includes the operator's query, the pseudo-ranges and a time-stamp indicating the time the pseudo-ranges were obtained. (In this detailed description, an outbound data package refers to a data package transmitted from a mobile unit.) A history showing the most recent positions of mobile unit 1 may also be included in the outbound data package. In this embodiment, data processing station 18 keeps track of the time since the last update. The outbound data package is then transmitted by the mobile unit's transmitter over wireless link 23 to a service connection 10 on data network 27, which relays the outbound data package to data processing station 18. Alternatively, instead of sending the pseudo-ranges as described above, mobile unit 1 obtains a "measured" position using a triangulation technique on the pseudo-ranges. This measured position of mobile unit 1 is then included in an outbound data package. The outbound data package also includes a position update request or query, together with the pseudo-ranges or the measured position. Mobile unit 1 reports its position either automatically, according to a predetermined schedule, or manually, through commands entered by an operator into the mobile unit. Wireless communication between the mobile unit and data network can be accomplished, for example, using a cellular digital packet data (CDPD) modem or via satellite.

Figure 2:
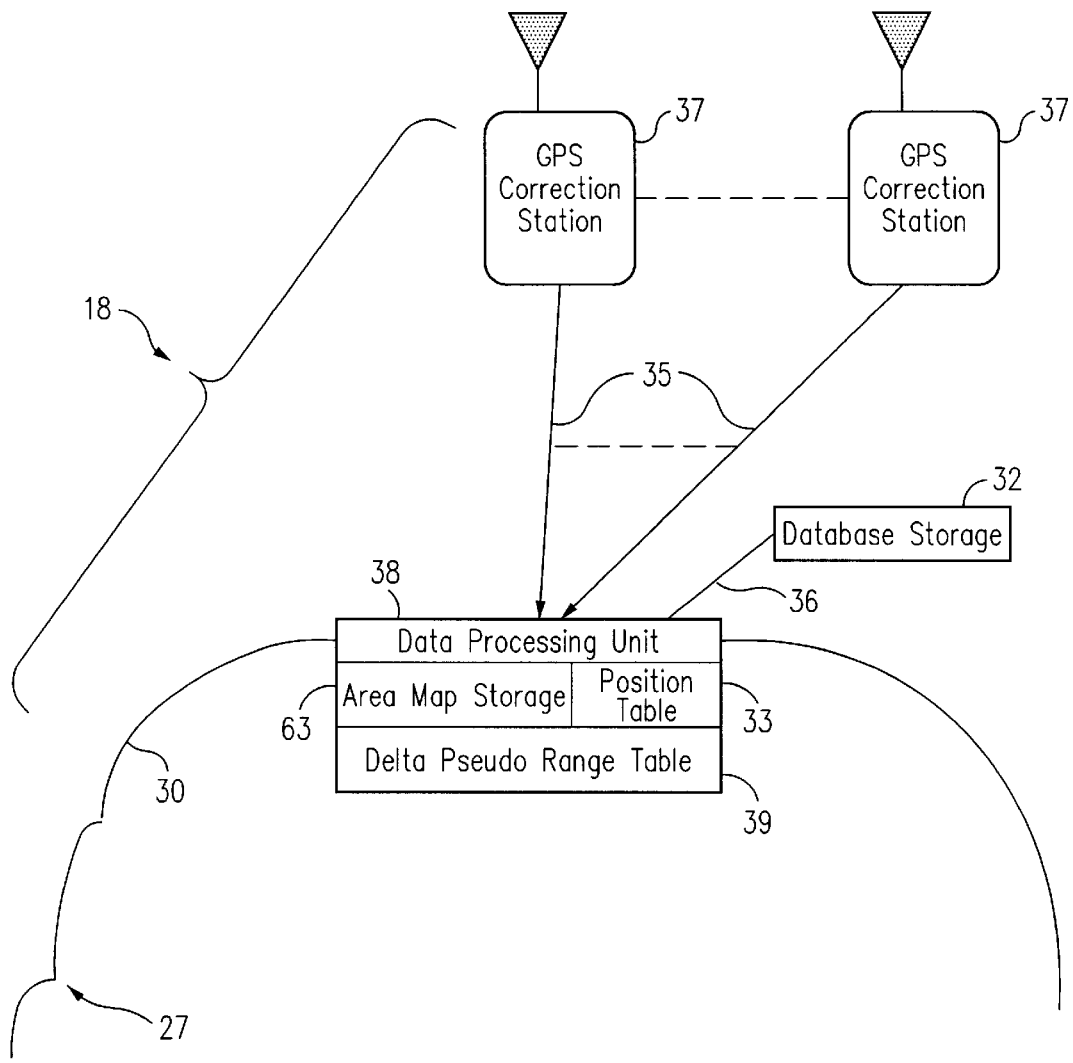
FIG. 2 illustrates a data processing station 18 in a vehicle location system of the present invention.

FIG. 2 illustrates a data processing station 18 of the present invention, including a data process unit 38 which handles the computation at data processing station 18. If data processing station 18 receives an outbound data package which includes a measured position of the mobile unit (presumably the position of the vehicle), the measured position is entered into a position table 33 (FIG. 2). If the outbound data package includes pseudo-ranges, however, data processing station 18 obtains the measured position of the mobile unit for position table 33 by applying triangulation technique on the pseudo-ranges.

Alternatively, data processing station 18 can also use pseudo-ranges in conjunction with differential correction information, or delta-pseudo-ranges. The delta-pseudo-ranges, which are obtained by data processing unit 38 from correction stations (e.g., correction stations 37) and stored in a delta-pseudo-range table (e.g., delta-pseudo-range table 39 of FIG. 2), are correction factors for the geographical area in which the mobile unit is currently located. Data processing unit 38 can connect to correction stations 37 via wired or wireless communication links, or via a data network, such as data network 27. The position of a differential correction station is precisely known. Typically, a differential correction station serves an area 200 miles in diameter. In the present embodiment, a differential correction station in each of the vehicle locating service's service areas is desired. The delta-pseudo-ranges are used in conjunction with the pseudo-ranges received from satellite constellation 8 to provide a corrected measured position of the mobile unit. The corrected measured position is then stored in position table 33 (FIG. 2).

A differential correction station receives code sequences from GPS satellite constellation 8 (FIG. 1) to obtain a first set of pseudo-ranges based on the received code sequences. The differential correction station then calculates a second set of pseudo-ranges based on its known position and the relative positions of the satellites in satellite constellation 8. Delta-pseudo-ranges are then computed using the two sets of pseudo-ranges. These delta-pseudo-ranges are provided to data processing unit 38, and stored in delta-pseudo-range table 39 for computing corrected measured positions of the mobile units. Alternatively, correction to the measured position can also be achieved using positional corrections, rather than delta-pseudo-ranges. To obtain a positional correction, a differential correction station receives GPS positioning code sequences, and obtains, based on the received code sequences, a measured position of its own position expressed in terms of the longitude and latitude. This measured position (called a "fix") is compared to the precisely known position of the differential correction station to obtain the positional correction expressed in a delta-longitude quantity and a delta-latitude quantity. To use these delta-longitude and delta-latitude quantities to find a corrected measured position of mobile unit 1, the pseudo-range obtained by mobile unit 1 is first used to triangulate a measured position to obtain a raw position expressed in a raw longitude and a raw latitude. The corrected longitude for the mobile unit is this raw longitude plus the applicable delta-longitude obtained by the differential correction station in the vicinity. Likewise, the corrected latitude is the raw latitude of the mobile unit plus the delta-latitude computed by the differential correction station in the vicinity.

In addition to computing the corrected measured position, data processing station 18 searches a database 32 and associated area map storage 63 to process the operator's query received in the outbound data package. Database 32 maintains such travel-related information as maps, traffic situation in a particular area, positions of service stations and destinations of interest. Storage for database 32 can be implemented using any mass storage media, such as hard disks, RAMs, ROMs, CD-ROMs, and magnetic tapes. For example, infrequently updated information (e.g., maps or destinations of interest) can be stored on CD-ROMs, while frequently updated information (e.g., current traffic conditions) can be stored on RAM. Database 32 is accessed by data processing unit 38.

Position table 33 stores the last known measured positions of the mobile units in the system. The measured position stored in positions table 33 can be used for compiling vehicle position maps by monitor units 22 (FIG. 1). FIG. 7 represents one implementation of position table 33. Position table 33 contains the measured positions of several mobile units, identified respectively by an identification number 160, at particular times 162. The measured position of each mobile unit is represented by a time-stamp 162, a measured latitude value 165, a measured longitude value 168, and a velocity 170.

Delta-pseudo-range table 39 stores the delta-pseudo-ranges of each service area. FIG. 9 represents one implementation of delta-pseudo-range table 39 used by data processing station 18 (FIG. 1). As shown in FIG. 9, delta-pseudo-range table 39 maintains the delta-pseudo-ranges 186 of each service area (indicated by identification 180) from each of a group of satellites at each of the specified times 188. Each value of the delta-pseudo-range data 186 indicates the delta-pseudo-range to a particular satellite. Area map storage 63 stores area maps with position markers indicating the mobile units and landmarks. The response to the query can be in text, graphical or audio form. If the query is for directions, for example, a map including the measured position or corrected measured position and the position of the destination is retrieved. Typically, a position marker is provided to identify the position of the requested destination. The map and a result of the database search (i.e., a response to the operator's query) are then packaged into an inbound data package, which is transmitted to mobile unit 1 through data network 27 via network connection 10 and wireless link 23. (In this detailed description, an inbound data package refers to a data package received by a mobile unit or a monitor unit.)

Instead of computing the corrected measured position at data processing station 18, a microprocessor in mobile unit 1 can also be used to compute a corrected measured position from pseudo-range information the mobile unit received from satellite constellation 8 and delta-pseudo-range information received from data processing station 18. Under this arrangement, instead of the measured corrected position, data processing station 18 includes in the inbound data package the delta-pseudo-ranges for the current position of mobile unit 1. In any event, upon receiving the inbound data package, mobile unit 1 displays on its screen the corrected measured position and the position of the destination, typically by overlaying the positions on the map received, along with the response to the query. For example, if the operator requests directions to a nearby gas station, a position marker identifying the gas station and a position marker identifying the mobile unit's current position are displayed on the map, together with the response to query (i.e., directions as to how to get to the gas station). The response to the query can be a text description or a graphical representation of the directions placed next to or overlaying the map. Alternatively, instead of sending the map the positions and the response to query in the inbound data package, data processing station 18 can provide in the inbound data package a picture file of the map, with the markers and the response to the query already embedded. Special markers can be used for indicating interesting conditions. For example, a mobile unit that has been stationary for a predetermined period of time can be marked by a special marker to signal monitor units of an exceptional condition. The picture file is then simply displayed by mobile unit 1.

Data network 27 can be a wide area data network, such as the Internet, or a telephone network, including wired or wireless communications, or both. Data network 27 can also be accessed via a satellite link. For example, in FIG. 1, satellite 5 provides access to data network 27, communicating with mobile unit 3 through a wireless communication channel 25. Satellite 5 allows the present invention to be used in a remote area where other forms of transceivers, such as cellular phone transceiver stations, are expensive to implement. In one embodiment, the inbound and outbound data packages are encrypted for security. One method of image encryption and decryption that can be used for this application is described in U.S. Pat. No. 5,541,993 by Eric Fan and Carey B. Fan, July 1996. This disclosure of U.S. Pat. No. 5,541,993 is hereby incorporated herein by reference. Service connection 10 can be a commercial transceiver station such as a cellular phone transceiver station. In another embodiment, service connection 10 is a dedicated transceiver station for the handling of communication related to the present invention.

In the embodiment shown in FIG. 1, another set of terminals (e.g., monitor 22) are provided in some applications to monitor the activities of the mobile units. For example, a monitor unit may send a request together with a mobile unit identification to data processing station 18 to obtain the measured position and speed of a specified mobile unit. One application for this capability can be found, for example, in a trucking company interested in tracking the positions of its fleet of trucks for scheduling and maintenance purposes. Monitor unit 22 can be a fixed unit or a portable unit. A portable monitor unit 22 is equipped with a wireless transceiver for accessing data network 27 via service provider 20 or wireless network service connection 10. Monitor unit 22 may also communicate with mobile unit 1 through data network 27 using a message exchange protocol. For example, monitor unit 22 may send a special command to mobile unit 1, and mobile unit 1 may send a message addressed to monitor unit 22. In one example the message communicated between mobile unit 1 and monitor unit 22 is in the form of an electronic mail message. Of course, the communication between monitor unit 22 and mobile unit 1 can be encrypted for security or to prevent unauthorized use. Monitor unit 22 also displays the elapsed time since the last position update graphically (data collected by data processing unit). The elapsed time can be represented graphically as a color code, grades of shade, a flashing interval, or any suitable symbolic representation.

When the Internet is used as data network 27, data processing station 18 is a node on the Internet and is assigned an Internet address. Monitor unit 22 can include a computer installed with a conventional web browser. The Internet address of data processing station 18 is used by the monitor unit for communicating with data processing unit 18.

A land based vehicle normally travels a limited distance during a short time period. On the other hand, an area map showing the location of the vehicle is only useful when the vicinity of the vehicle is also shown. Consequently, a vehicle is often located in the area covered by the same map for the period of several position updates. This principle can be utilized to reduce the amount of data transmitted and thus improve the efficiency of the system.

According to the present invention, a plugin program for a web browser can be installed in monitor unit 22. During each location update, the plugin program downloads the new location of the vehicle and compares the new location with the area map stored in monitor unit 22. If the new location of the vehicle is within the boundary of the area map, a new location marker representing the vehicle is overlaid on the area map. If the location of the vehicle is outside the boundary of the area map, a new area map is downloaded and the location of the vehicle is marked on the new area map. The plugin program can be downloaded over the Internet from the vehicle location service provider, or can be loaded directly from software storage media.

Figure 12:
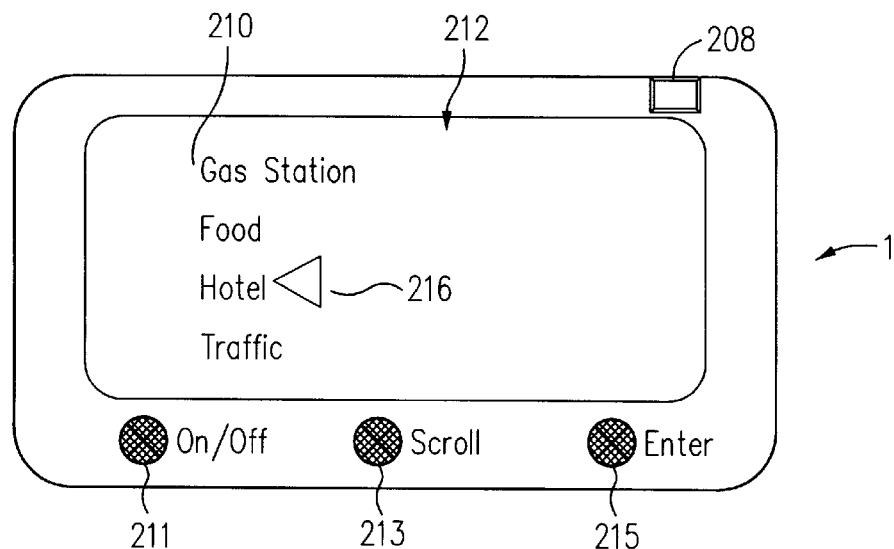
FIG. 12 illustrates one display in a mobile unit according to the present invention.
Figure 13:
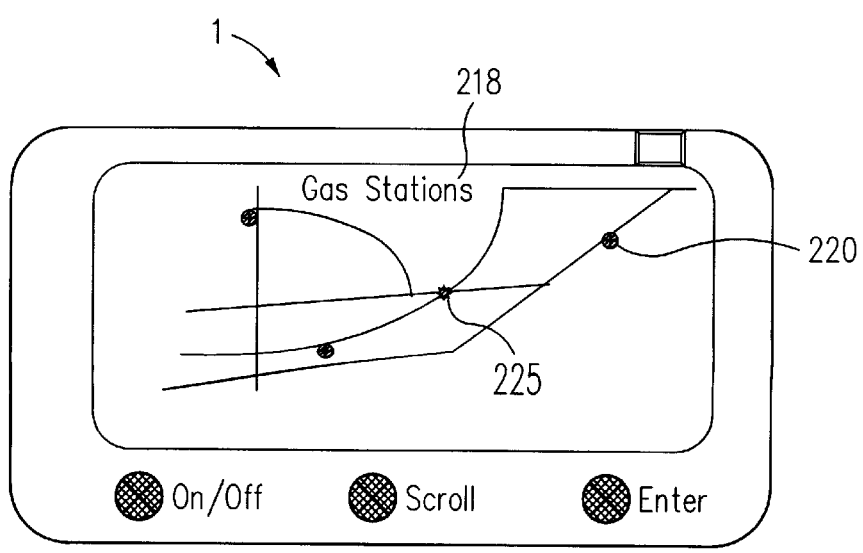
FIG. 13 illustrates one display in a mobile unit according to the present invention, specifically displaying a map with travel information overlaid thereon.

FIGS. 12 and 13 shows one implementation of mobile unit 1 adapted for allowing an operator to send a travel-related query under the present invention. As shown in FIG. 12, mobile unit 1 includes liquid crystal display (LCD) 212, transceiver/antenna assembly 208, power switch 211, a scroll key 213, and an "enter" key 215. Scroll key 213 and enter key 215, in conjunction with a software-generated command menu 210 displayed on LCD 212, allow the user to enter simple commands, such as the travel-related query described above. For example, as shown in FIG. 12, command menu 210 shows selections "gas station," "food", "hotel", and "traffic". By pressing scroll key 213, an operator of mobile unit 1 causes a cursor 216 to step through the selections. When the operator presses enter key 215, an outbound data package including the query or command is transmitted by transceiver/antenna assembly 208 to processing station 18. In this embodiment, as shown in FIG. 13, the response from data station 18 is received in mobile unit 1 through transceiver/antenna assembly 208 and displayed on LCD 212. In this instance, the query sent to data station 18 corresponds to the selection of "gas station". In FIG. 13, data processing station 18 returns to mobile unit 1, in an inbound data package, a map which is displayed on LCD 212, showing the vicinity of mobile unit 1. Mobil unit 1's position is indicated on LCD 212 by a marker 225. The locations of several gas stations, indicated by markers 220 are also displayed.

Figure 3:
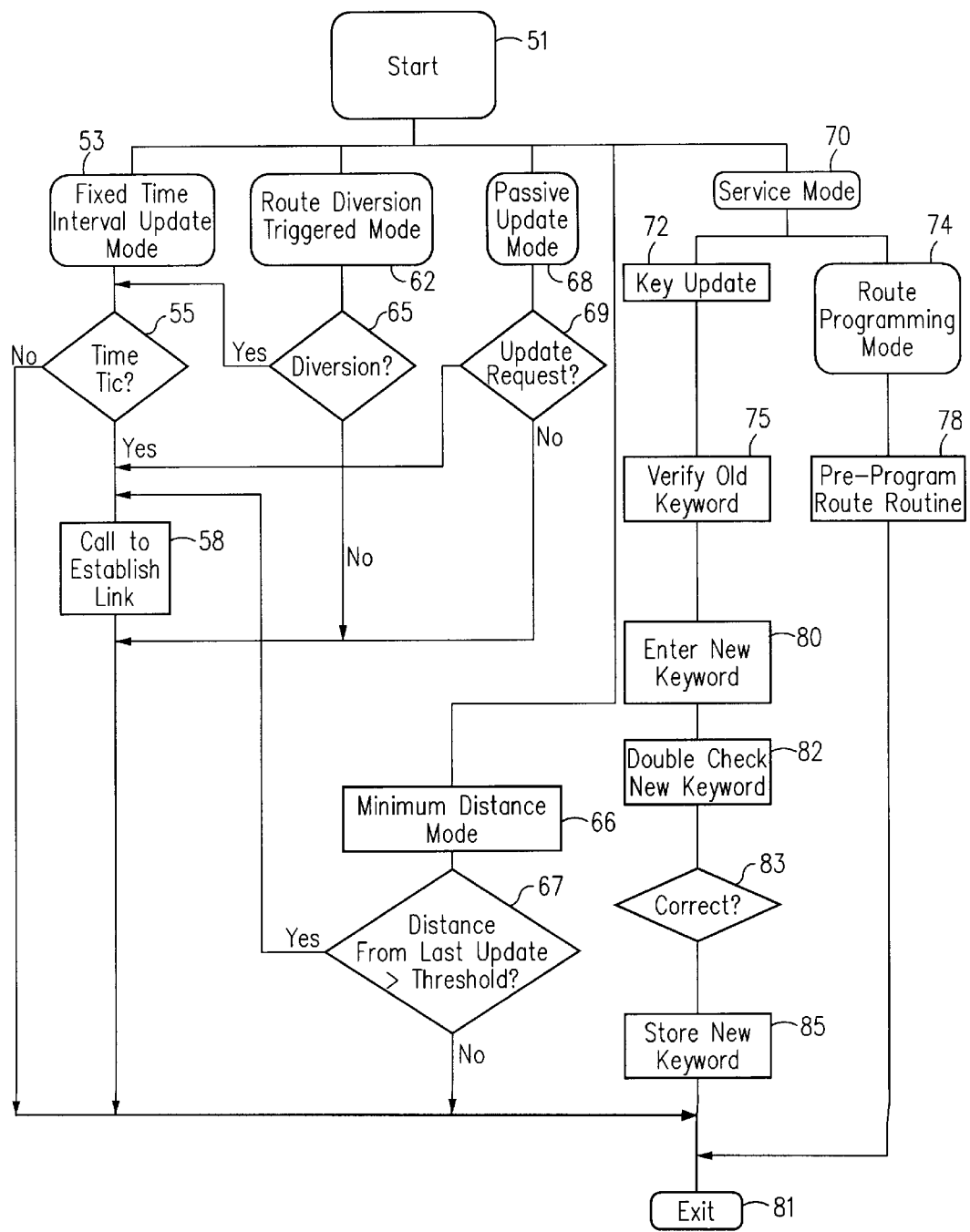
FIG. 3 illustrates a program flow in a mobile unit of the present invention.

FIG. 3 is a flow diagram showing the operation of mobile unit 1 (FIG. 1). At step 51, one of four modes of operation is selected: periodic update mode 53, route diversion triggered mode 62, passive update mode 68, minimum distance mode 66 and service mode 70. Under periodic update mode 53, mobile unit 1 periodically reports pseudo-ranges of its position to data processing station 18, so as to update the measured position of mobile unit 1 stored at data processing station 18. Under route diversion triggered mode 62, mobile unit 1 reports its position only upon a diversion from a pre-programmed route or a diversion from a predetermined time schedule. Under update mode 68, the position of mobile unit 1 is reported under an operator's control. Service mode 70 is not an operating mode, but is used to program mobile unit 1.

Under periodic update mode 53, at step 55, mobile unit 1 waits for the next scheduled position update. At the time of a scheduled update, i.e., at step 58, mobile unit 1 calls to establish network service connection 10 for accessing data network 27, and transmits to data processing station 18 an outbound data package. Upon receiving the outbound data package, data processing station 18 responds to the operator's query by searching database 32, updating a map retrieved from map storage 63, and transmitting the map to mobile unit 1 an inbound data package.

Under route diversion triggered mode 62, the measured position of mobile unit 1 is obtained at the mobile unit using pseudo-range data without differential correction. At step 65, this measured position is compared with a pre-programmed route and a schedule. If the current position is a substantial deviation from the pre-programmed route or from the schedule, mobile unit 1 branches to step 55 to create a service connection 10 for performing the update described above at the next scheduled reporting time.

Under passive update mode 68, a measured position update occurs when an operator issues an update request in an outbound data package. At step 69, when an operator initiates an update request, mobile unit 1 branches to step 58 to create network service connection 10. An outbound data package including the update request is transmitted via network service connection 10 to data processing station 18 over data network 27.

Under minimum distance mode 66, the distance traveled since the last update must exceed a threshold value before a new update is issued. Step 67 compares the distance traveled since the last update with the threshold value.

Under service mode 70, an operator of mobile unit 1 can effectuate two major functions: route programming function 74 and password update function 72. In route programming function 74, the operator of mobile unit 1 enters a new route to replace a pre-programmed route in mobile unit 1. In this description, a "route" connotes not only a series of physical coordinate sets marking the path of a vehicle, but also the time at which the vehicle is scheduled to arrive at or depart from each set of physical coordinates. In this embodiment, to operate mobile unit 1, an operator must first be verified by supplying a password. The password can be modified under user password update mode 72. At step 75, the operator provides the current password to identify himself/herself, and to obtain authorization to modify the password. Typically, mobile unit 1 requests the operator to enter the new password twice to ensure that the new password is correctly entered. At step 85, the successfully entered new password is written into storage, thereby superseding the old password.

Figure 4:
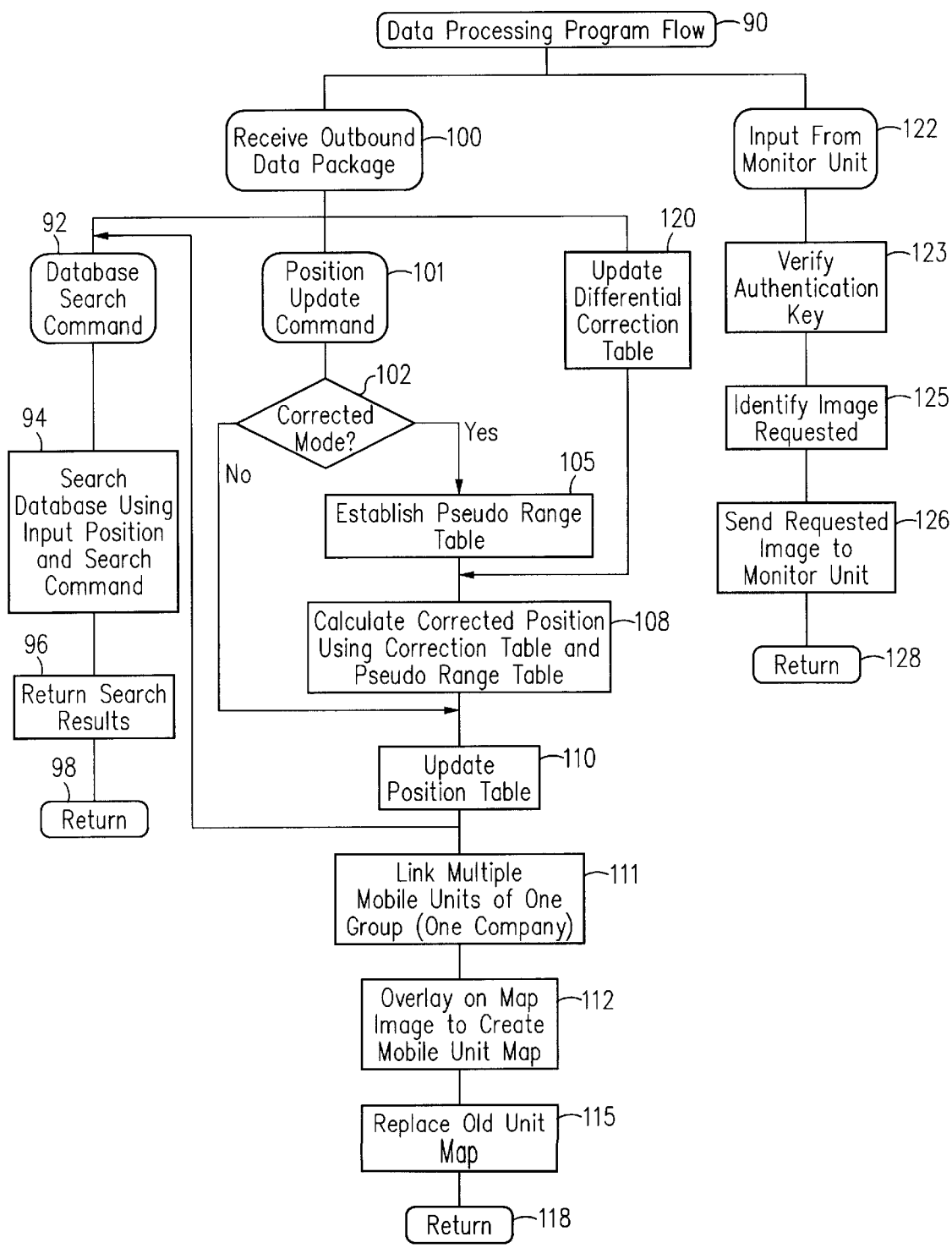
FIG. 4 illustrates a program flow in a data processing unit of the present invention.

FIG. 4 illustrates a flow diagram of a data processing program used by data processing station 18 (FIG. 1). Beginning at step 90, data processing station 18 receives either an outbound data package (step 100) or a command from a monitor unit (step 122), such as monitor unit 22. If the received outbound data package includes a position update request (step 101), the data processing program determines at step 102 whether a corrected measured position update is requested. If a corrected measured position update is requested (step 105), the data processing program obtains the pseudo-ranges from the outbound data package and enters them into a pseudo-range table. An example of a pseudo-range table is provided in FIG. 8. As shown in FIG. 8, pseudo-range table 40 includes one entry for each mobile unit. Each entry of pseudo-range table 40 includes an identification 172, pseudo-ranges (175) of the mobile unit to 8 satellites (PR1–PR8), and a time-stamp 178, indicating the time at which the pseudo-ranges are taken.

Figure 10:
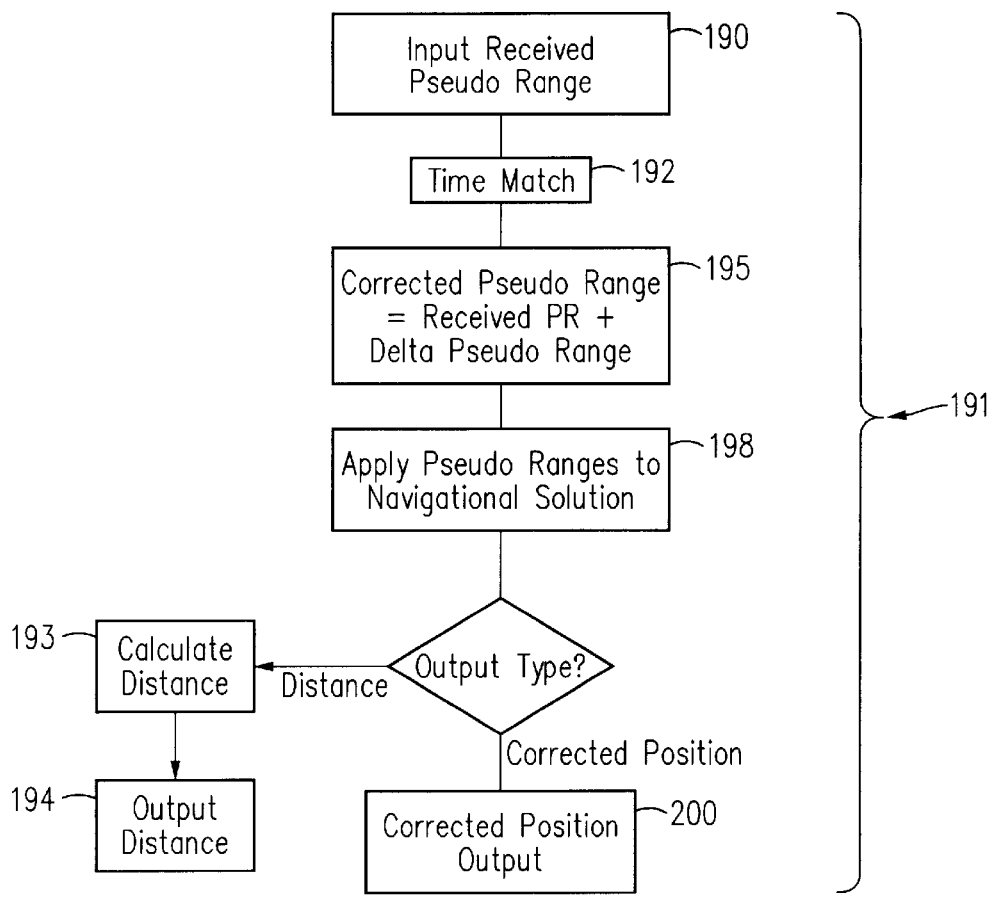
FIG. 10 illustrates the logic flow of a differential correction process according to the present invention.

FIG. 10 is a flow diagram of one implementation of a differential correction process 191. As shown in FIG. 10, at step 190, the pseudo-ranges of a mobile unit are either received from an outbound data package or retrieved from pseudo-range table 40 of FIG. 8. At step 192, all delta-pseudo-ranges from delta-pseudo-range table 39 are examined to find the delta-pseudo-ranges from a differential correction station in the mobile unit's service area, and which have a time-stamp closest to the time-stamp of the pseudo-ranges of the mobile unit sending the query. At step 195, the corrected pseudo-ranges for the mobile unit are obtained by adding to the pseudo-ranges of the mobile unit corresponding delta-pseudo-ranges. The corrected measured position of the mobile unit is then calculated at step 198 using the corrected pseudo-ranges. At step 199, if it is decided that a corrected position is desired, the corrected position is provided at step 200. If it is decided at step 199, on the other hand, that a distance to a known position is desired, then the distance is calculated at step 193, and is provided as output at step 194.

Returning to FIG. 4, at step 120, data processing program retrieves from delta-pseudo-range table 39 a set of delta-pseudo-ranges for the mobile unit taken at the same time and in the same service area the pseudo-ranges of the requesting mobile unit were taken. At step 108, the data processing program computes the corrected measured position using the pseudo-range and delta-pseudo-range information obtained at steps 101 and 120. If a corrected measured position is not requested, steps 105 and 108 are skipped, and the data processing program enters the measured position of the mobile unit into position table 33.

At step 111, the data processing program links in database 32 the reporting mobile unit's updated measured position entry in position table 33 with the measured position entries of other mobile units in the reporting mobile unit's group. At step 112, in this embodiment, the measured positions of the mobile units in one linked group are associated with (or "overlaid on") a digital map, so that the positions and the identification of all vehicles of that group can be represented by position markers and text on the map. Such a map allows a manager of a group of vehicles to conveniently monitor the activities of the vehicles. At step 115, the updated position of the mobile unit and the newly created associations among the mobile units and the digital map are replaced in database 32. The data processing program then returns to step 90 to receive the next outbound data package or command.

As mentioned above, an outbound data package can contain a query for a database search, e.g. a request for directions to a nearby restaurant. When such a query is identified (step 92), database 32 is searched for formulating a response at step 94. To formulate the response, the data processing program uses the measured position of the requesting mobile unit and other relevant positional information. The response is returned in an inbound data package to the requesting mobile unit at step 96.

Figure 11:
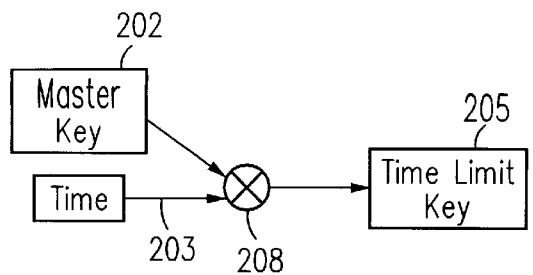
FIG. 11 illustrates a process for generating a time-limited key from a master key and a specified duration.

The data processing program can also receive a request from monitor unit 22. Typically, such a request is provided with an authentication key over data network 27 (FIG. 1). At step 123, the authentication key, hence the identity of the requesting monitor unit, is verified. The authentication key allows the requesting monitor unit access to the records of a specific mobile unit or a specific group of mobile units. To enhance security, authentication keys can be made time-limited, i.e., each authentication key is valid only for a specified duration. FIG. 11 shows a process for making a time-limited key. As shown in FIG. 11, using a mixing function represented by reference numeral 208, a master key 202 (which identifies the owner) is mixed with a value representing a time duration 203. The resulting value 205 serves as a time-limited authentication key over the specified time duration. Security is enhanced since forging a valid time-limited authentication key requires both knowledge of the master key and the value representing the time duration for which the key is valid.

At step 125, if the verification is successful, the data processing program responds to the request. In one embodiment, a digital map (e.g., the one created above at step 112) providing the positions of a group of vehicles is returned at step 126 to the requesting monitor unit.

Figure 5:
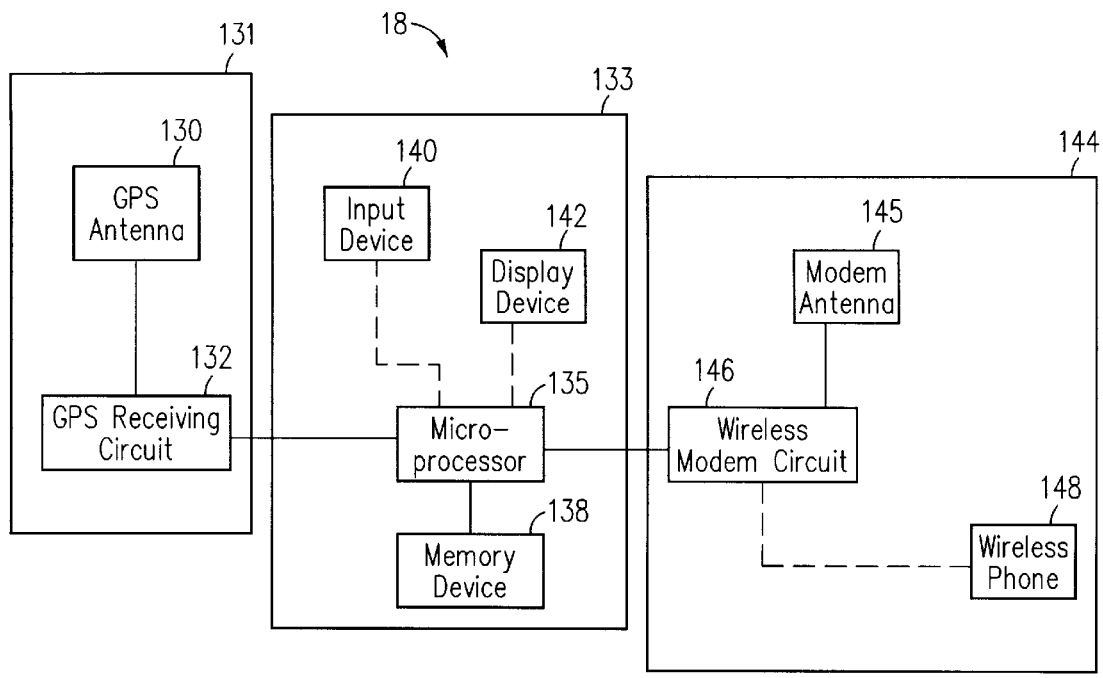
FIG. 5 is a block diagram of a mobile unit of the present invention.

FIG. 5 is a block diagram of a mobile unit, such as mobile unit 1. As shown in FIG. 5, mobile unit 1 has three functional sections: GPS receiving section 131, control section 133, and communication section 144. GPS receiving section 131 includes GPS antenna 130 for receiving and providing GPS ranging signals to receiving circuit 132, which processes the received GPS ranging signals to obtain a pseudo-range to each of the GPS satellites within mobile unit 1's line of sight. Control section 133 includes a microprocessor 135, input device 140, display device 142, and memory device 138. Input device 140 is an optional feature which allows commands and requests to be entered. Input device 140 can be a keyboard, a mouse, a track ball, a pressure sensitive display panel, or any combination of these and other input devices. Display device 142 is also an optional device, which is used to provide visual responses to entered commands and requests, and to display relevant information (e.g. query response from data processing unit 18, or a command from monitor unit 22). The pseudo-ranges from GPS receiving section 131 are provided to control section 133, where the pseudo-ranges are combined with an update request or a query in an outbound data package for data processing station 18. The outbound data packages are transmitted to data processing station 18 by wireless transceiver section 144. Wireless transceiver section 144 includes a wireless modem circuit 146 with an antenna 145 or, alternatively, a wireless telephone network interface 148. Wireless modem circuit 146 receives an outbound data package from control section 133 for transmission to data network 27 through modem antenna 145 and a wireless network service connection, such as service connection 10 (FIG. 1). Alternatively, wireless modem circuit 146 provides the outbound data package to data network 27 over wireless telephone network interface 148 via service connection 10. Depending on the application, control section 133 may or may not be programmed for receiving an inbound data package from wireless transceiver 144. For example, if mobile unit 1 is used only for reporting position, control section 133 need not be programmed to receive inbound data packages.

Figure 6:
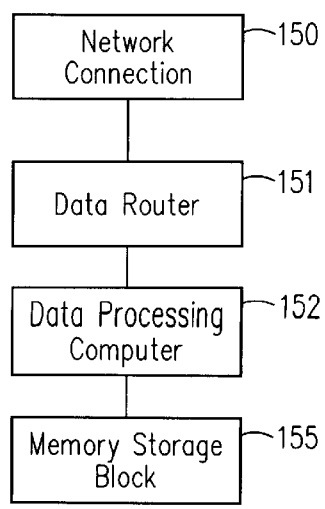
FIG. 6 is a block diagram of a data processing unit of the present invention.

FIG. 6 is a block diagram of a data processing unit, e.g. data processing unit 38 of FIG. 2. Data processing unit 38 includes a network interface 150 for interfacing data processing unit 38 with data network 27, a data processing computer 152 for providing the computational power for processing operator query and performing position update requests, and a memory system 155. A data router 151 can be provided between network interface 150 for connecting data processing computer 152 to a local area network.

The principles of the present invention can be applied to a wide variety of services. For example, a courier service company may provide a mobile unit to each of its delivery persons. A delivery person may use the mobile unit to obtain directions to a destination. A time-limited key may be issued to a customer, who can then use the time-limited key to track the delivery of his/her package through data processing station 18. In this instance, the customer plays the role of monitor unit 22 described above. As described above, monitor unit 22 may access data processing station 18 through the Internet. With the time-limited key, the customer can obtain the present position of the package, monitor the performance of the courier company, and estimate the expected arrival time of the package at the destination. Further, the customer may also send additional or alternative instructions to the delivery person (e.g., he/she may instruct the delivery person to abort the delivery, or to re-route the package to a new destination). The time-limited key issued to the customer expires when the package is delivered, or when a certain amount of time has passed.

The present invention allows even small companies with limited resources to have the benefits of a vehicle locating system, even when the vehicles tracked are few and scattered over a large geographical area. Since a data network, such as the Internet, is used in the present invention, the hardware investment for such use is minimal, as compared to prior art vehicle location systems.

As another example, a vehicle rental company may install mobile units on its vehicle fleet. The speeds and measured positions of these vehicles can thus be monitored using a monitor unit. In yet another example, a metropolitan bus company may install mobile units on its buses, and set the mobile units to route diversion triggered mode 62 discussed in conjunction with FIG. 3 above. When a bus is not running according to schedule, or deviates from a designated route, the mobile unit signals a dispatcher immediately. Timely remedial measures can thus be carried out.

In another application of the present invention, pseudo-ranges or measured position information transmitted from mobile units are used to calculate the speeds at which the vehicles travel. This information is compiled into database 32 at data processing station 18, and made available for access through monitor units, such as monitor 22. Such information allows shipping companies to route their vehicles away from traffic congestions and diversions. Radio stations or television stations can access this database from which to report traffic conditions. The information can also be used by municipal authorities in studying traffic patterns of selected vicinities to assist in planning new infrastructures.

When the Internet is used as data network 27 (FIG. 1), the necessary hardware and software for implementing a monitor unit are readily available. Most computers that have the ability to access the Internet, together with a standard web browser, can be used to access data processing station 18 to perform the functions of the monitor units described above. Since a monitor unit can receive a map from data processing station 18, such as the map displayed on LCD 212 in FIG. 13, which can be displayed using conventional graphics software, the monitor unit is not required to be equipped with any special map software or a map database. Because the cost of communication on Internet is inexpensive, a vehicle monitoring system according to the present invention can be deployed on a world-wide basis at minimum cost. With increased bandwidth in data network 27, the present invention can also be used in aircrafts, ships and other vessels for navigational purposes. Therefore, even though the present invention is described using the above examples, the scope of the invention is not limited by these examples. Numerous variations and modifications are possible within the scope defined by the following claims.

We claim:

1. A vehicle locating system comprising:
   a data processing station connected to a data network accessible by wireless communication, said data processing station having a database including maps; and
   a mobile unit including a global positioning system (GPS) receiver and a wireless transmitter, said receiver receiving positional information from GPS satellites and transmitting said positional information to said data processing station via said data network; wherein when said data processing station receives said positional information, said data processing station computes a measured position for said mobile unit, stores said measured position of said mobile unit in said database, associates said measured position of said mobile unit with a map in said database, creates from said may a second map embedded therein a marker indicating said measured position of said mobile unit, and provides said second map for display through a data network.

2. A vehicle locating system as in claim 1, further comprising a monitor unit accessing said data processing station via said data network for said positional information of said mobile unit.

3. A vehicle locating system of claim 1, wherein said mobile unit transmits said positional information to said data processing station using an encryption.

4. A vehicle locating system of claim 1, wherein said positional information includes a time-stamp indicating the time when the positional information was received.

5. A vehicle locating system of claim 2, wherein said data processing station associates said measured position of said mobile unit with a map in said database.

6. A vehicle locating system of claim 1 further comprising a monitor unit, wherein said second map is provided to said monitor unit for display.

7. A vehicle locating system of claim 6, said mobile unit further including a display device, said mobile unit displaying graphically an elapsed time since its last transmission of said positional information to said data processing unit.

8. A vehicle locating system of claim 7, wherein monitor unit displays said elapsed time using a symbolic representation.

9. A vehicle locating system of claim 1, wherein said data processing unit receives correctional data from a differential correction data source, wherein said data processing station computes a corrected measured position of said mobile unit using said correctional and said positional information received from said mobile unit.

10. A vehicle locating system of claim 1, wherein said mobile unit transmits said positional information to said processing data station at predetermined time intervals.

11. A vehicle locating system of claim 1, wherein said data processing station marks in said map a mobile unit that remains stationary over a predetermined time period with a symbol indicating an exceptional condition.

12. A vehicle locating system of claim 2, wherein said data processing station verifies communication from a monitor unit by an authentication scheme.

13. A vehicle locating system of claim 1, wherein said mobile unit is assigned a route, wherein said mobile unit transmits said positional information to said data processing station when said mobile unit deviates from said assigned route.

14. A vehicle locating system of claim 1, wherein said data network comprises a publicly shared network such as the Internet.

15. A vehicle locating system of claim 14, wherein said data processing station receives said positional information from a plurality of mobile units, and wherein said data processing station compiles statistical data from said positional information received from said mobile units.

16. A vehicle locating system of claim 15, wherein said statistics includes traffic condition statistics compiled from said positional information.

17. A vehicle locating system of claim 15, wherein said data processing station compiles statistics relating to vehicle usage and drivers habit.

18. A vehicle locating system of claim 15, wherein said statistics relates to traffic pattern on a particular route.

19. A vehicle locating system of claim 15, wherein said data processing station compiles a travel history for a vehicle on which said mobile unit is placed to establish a report on said vehicle.

20. A vehicle locating system of claim 19, wherein said data processing stations schedules vehicle maintenance according to travel history information provided by said positional information.

21. A vehicle locating system of claim 14, wherein said mobile unit automatically initiates a position update when a distance traveled since last update exceeds a pre-determined value.

22. A vehicle locating system of claim 14 further comprises a monitor unit connected to said network, wherein said monitor unit causes said mobile unit to initiates a position update.

23. A vehicle locating system of claim 14 further comprising:
   a monitor unit connected to said network; and
   a message exchange protocol implemented on said network to allow digital data message exchange between said monitor unit and said mobile unit.

24. A vehicle locating system of claim 9, wherein said data processing station further computes a distance of said mobile unit to a designated location.

25. A vehicle locating system in claim 14, wherein said wireless communication comprises communicating using a cellular digital packet data (CDPD) protocol.

26. A vehicle locating system in claim 14, wherein said wireless communication comprises communication via a cellular telephone modem.

27. A vehicle locating system in claim 14, wherein said wireless communication comprises communication over a satellite data link.

28. A vehicle locating system in claim 14 further comprises a monitor unit, wherein said monitor unit is installed on a moving vehicle and is connected to said data network through a wireless data communication link.

29. A vehicle locating system in claim 14 further comprises a monitor unit connected to said data network, wherein said data processing station provides a monitor unit a key valid for a limited time to allow said monitor unit access to said data processing station for a limited time.

30. A vehicle locating system of claim 28, wherein (a) said database further comprises travel-related information and said mobile unit having a receiver for receiving wireless communication, (b) said mobile unit transmits to said data processing station a query for travel-related information; and (c) in response to said query, said data processing station retrieves said travel-related information from said database and transmits said travel-related information to said mobile unit.

31. A vehicle locating system of claim 16, wherein, said traffic condition statistics are organized by geographical areas.

32. A vehicle locating system of claim 31, wherein said data processing station causes said traffic condition statistics to be transmitted to said mobile unit in a form that can be played as an audio message.

33. A vehicle locating system of claim 30, wherein said data processing station provides, in response to said query, a map showing a route including the measured position of said mobile unit.

34. A vehicle locating system of claim 30, wherein said data processing station provides said travel-related information in the form of a map relating to the positional information of said mobile unit, said data processing station providing on said map markers indicating locations of interest.

35. A method for locating a mobile unit, comprising the steps of:
receiving in a mobile unit global positioning signals transmitted by global positional system (GPS) satellites to derive a set of positional data representing the position of said mobile unit relative to said satellites;
transmitting said positional data to a data processing station through a data network;
receiving in said processing data station said positional data and storing said positional data in a database for later retrieval;
retrieving said positional data in said processing station and computing a measured position of said mobile unit;
creating a map embedded therein a marker indicating said measured position of said mobile unit; and
providing said map by said processing station for display through said data network.

36. A method as in claim 35, wherein said positional data comprises pseudo-ranges.

37. A method as in claim 36, further comprising the steps of:
converting said pseudo-range data into a measured position for said mobile unit; and
storing said measured position in said database.

38. A method as in claim 37, further comprising the steps of:
receiving differential correction data from a differential correction station,
using said differential correction data and said pseudo-range data received from said mobile unit to calculate a corrected measured position of said mobile unit; and
storing said corrected measured position of said mobile unit in said database.

39. A method as in claim 35, wherein said data network comprises the Internet.

40. A method for calculating a corrected measured position of a mobile unit at a data processing station, comprising the steps of:
at said mobile unit, receiving global positioning system (GPS) data signals from GPS satellites;
sending said positional information to said data processing station;
at said data processing station, receiving differential correction data corresponding in time to said positional information from a differential correction station;
sending said differential correction data to said mobile unit; and
at said mobile unit, calculating said corrected measured position of said mobile unit; based on said positional information and said differential data.

41. A method as in claim 40, further comprising the step of calculating a distance between the corrected measured position of the mobile unit and a pre-determined geographical position.

42. A vehicle locating system of claim 14, further comprising a monitor unit accessing said data processing station through said data network for said positional information and said maps associated with said mobile unit, wherein said monitor unit further comprises an Internet browser program and a plugin program interfaced with said Internet browser program, said plugin program is used for managing positional and map data.

43. A vehicle locating system of claim 42, wherein said monitor unit further having an area map on which location of said mobile unit is marked, said Internet browser program downloads an updated location of said mobile unit, said plugin program compares said updated location with said area map to determine whether or not a new area map needs to be downloaded from said data processing station.

44. A vehicle locating system of claim 23, wherein said digital data message is in the form of an electronic mail message.

* * * * *

UNITED STATES PATENT AND TRADEMARK OFFICE
CERTIFICATE OF CORRECTION

PATENT NO.    : 5,959,577
DATED         : September 28, 1999
INVENTOR(S)   : Roderic C. Fan and Amin A. Mufti It is certified that error appears in the above-identified patent and that said Letters Patent is hereby corrected as shown below:

Column 2,
Line 7, delete "are a" and insert -- area --;
Line 10, delete "an other" and insert -- another --;

Column 4,
Line 56, delete "position" and insert -- positions --;

Column 7,
Line 18, delete "Mobil" and insert -- Mobile --;
Line 19, immediately after "200" insert -- , --;
Line 22, delete "four" and insert -- five --;
Line 46, after "unit 1" insert -- in --;

Column 11,
Line 24, after "communication on" insert -- the --;
Line 48, delete "may" and insert -- map --;
Line 49, after "second map" insert -- having --;
Lines 62-64, delete;

Column 12,
Line 5, delete "monitor" and insert -- mobile --;
Line 12, after "correctional" insert -- data --;
Lines 36 and 42, delete "statistics" and insert -- statistical data --;
Line 40, delete "drivers" and insert -- driver's --;
Line 48, delete "stations" and insert -- station --;
Line 57, delete "initiates" and insert -- initiate --;

Column 13,
Line 28, immediately after "wherein", delete ",";
Line 58, after "map" insert -- having --;

UNITED STATES PATENT AND TRADEMARK OFFICE
CERTIFICATE OF CORRECTION

PATENT NO. : 5,959,577
DATED : September 28, 1999
INVENTOR(S) : Roderic C. Fan and Amin A. Mufti It is certified that error appears in the above-identified patent and that said Letters Patent is hereby corrected as shown below:

Column 14,
Line 13, delete "station." and insert -- station; --;
Line 26, after "sending" delete "said"; and
Line 34, immediately after "unit" delete ";".

Signed and Sealed this

Third Day of May, 2005

JON W. DUDAS
*Director of the United States Patent and Trademark Office*